(12) United States Patent
Lau

(10) Patent No.: US 10,298,160 B2
(45) Date of Patent: May 21, 2019

(54) MULTI-PHASE BRUSHLESS DIRECT-CURRENT MOTOR AND DRIVE METHOD THEREFOR

(71) Applicant: Chun To Lau, Tuen Mun (HK)

(72) Inventor: Chun To Lau, Tuen Mun (HK)

( * ) Notice: Subject to any disclaimer, the term of this patent is extended or adjusted under 35 U.S.C. 154(b) by 0 days.

(21) Appl. No.: 15/780,258

(22) PCT Filed: Feb. 1, 2016

(86) PCT No.: PCT/CN2016/073044
§ 371 (c)(1),
(2) Date: May 31, 2018

(87) PCT Pub. No.: WO2017/092174
PCT Pub. Date: Jun. 8, 2017

(65) Prior Publication Data
US 2018/0351489 A1    Dec. 6, 2018

(30) Foreign Application Priority Data

Dec. 2, 2015   (CN) .......................... 2015 1 0872243

(51) Int. Cl.
*H02P 6/08*    (2016.01)
*H02P 7/29*    (2016.01)
(Continued)

(52) U.S. Cl.
CPC ................. *H02P 7/29* (2013.01); *H02P 6/00* (2013.01); *H02P 6/08* (2013.01); *H02P 7/03* (2016.02);
(Continued)

(58) Field of Classification Search
CPC ..................................... H02P 6/08; H02P 7/04
(Continued)

(56) References Cited

U.S. PATENT DOCUMENTS 5,917,295 A * 6/1999 Mongeau ................ H02P 27/08
318/290
6,885,162 B2 * 4/2005 Stridsberg ................ H02K 3/28
310/184

FOREIGN PATENT DOCUMENTS

CN      1146659 A    4/1997
CN    104270062 A    1/2015
(Continued)

OTHER PUBLICATIONS

Search Report of Chinese Patent Application No. 201510872243.9 dated Jun. 9, 2017.
(Continued)

*Primary Examiner* — Bentsu Ro

(57) ABSTRACT

A multi-phase brushless direct-current motor and a drive method therefor. The motor comprises a motor body and a driving module, and the driving module comprises a controller, a plurality of H-bridge unipolar inverters each of which for a respective phase, and independent phase coil windings (1) which are successively electrically connected. The method comprises: outputting pulse width-modulated sine waves with identical frequency and amplitude from the controller thereby driving respective ones of the plurality of H-bridge unipolar inverters for each phase; wherein the pulse width-modulated sine waves correspond to every two adjacent phase coil windings having a non-zero phase difference, and phase differences of the plurality of phase coil windings are identical; and outputting sine wave driving voltages or sine wave driving currents in their corresponding phases from the respective ones of the plurality of H-bridge unipolar inverters to the corresponding, electrically connected phase coil windings. The multi-phase brushless direct-current motor and the drive method therefor can
(Continued)

realize sine-shaped voltage or current driving, thereby improving the efficiency and reducing noise.

11 Claims, 3 Drawing Sheets

(51) Int. Cl.
    *H02P 7/03*    (2016.01)
    *H02P 6/00*    (2016.01)
    *H02P 6/14*    (2016.01)

(52) U.S. Cl.
    CPC ............... *H02P 7/04* (2016.02); *H02P 6/085* (2013.01); *H02P 2209/11* (2013.01)

(58) Field of Classification Search
    USPC ............... 318/293, 294, 594, 599, 600, 603
    See application file for complete search history.

(56) References Cited

FOREIGN PATENT DOCUMENTS

| | | |
|---|---|---|
| JP | 2000324892 A | 11/2000 |
| JP | 2010525784 A | 7/2010 |
| JP | 2010288421 A | 12/2010 |
| WO | 2015083477 A1 | 6/2015 |

OTHER PUBLICATIONS

First Office Action of Chinese Patent Application No. 201510872243.9 dated Jun. 20, 2017.
Second Office Action of Chinese Patent Application No. 201510872243.9 dated Jan. 30, 2018.
Rejection Notice of Chinese Patent Application No. 201510872243.9 dated May 4, 2018.
First Examination Report of Japanese Patent Application No. 2018-529066 dated Mar. 1, 2019.

* cited by examiner

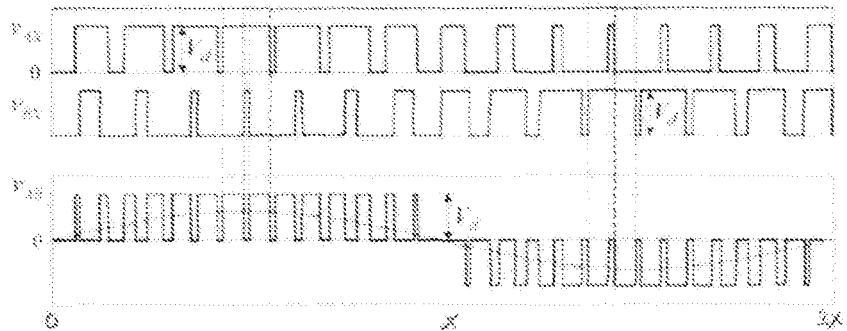
FIG. 4
| g1 | g2 | g3 | g4 | A | B | $V_{AB}$ |
|---|---|---|---|---|---|---|
| high | high | low | low | high | low | positive |
| low | low | high | high | low | high | negative |
FIG. 5
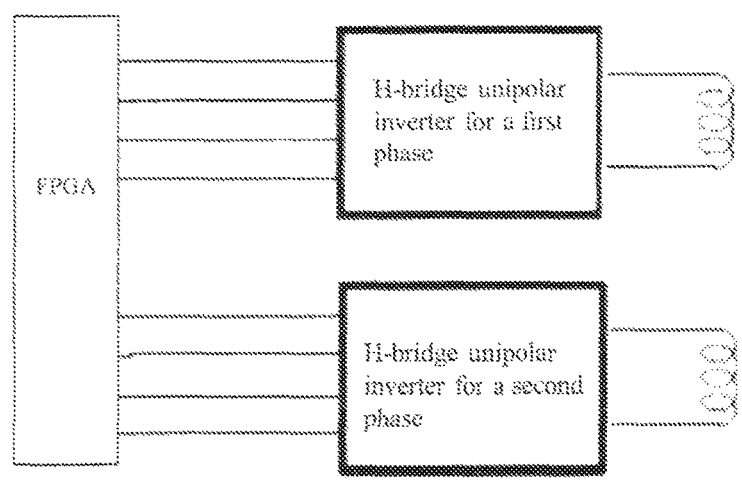
FIG. 6

MULTI-PHASE BRUSHLESS DIRECT-CURRENT MOTOR AND DRIVE METHOD THEREFOR

TECHNICAL FIELD

The present invention relates to a brushless direct current (DC) motor and more particularly to a multi-phase brushless DC motor and a drive method therefor.

BACKGROUND

Compared with other motors, a brushless DC motor exhibits advantages of energy saving and high reliability and has become increasingly popularized. Single-phase DC driving is achieved by a single H-bridge inverter with a Hall-effect sensor. In addition, a conventional three-phase DC motor, with or without a sensor, is typically driven by three half-bridges, and has phase coil windings that are typically configured in a star shape. As shown in FIG. 1, three phase coil windings 1 have a common terminal. Trapezoidal or sinusoidal magnetic field orientation control is the most common commutation method. However, in such a case, a voltage or current output by the inverter has a shape only similar to sine, and a brushless DC motor driven by such a voltage or current may cause large power consumption and audible noises.

SUMMARY

Technical Problem

The present invention needs to overcome the technical problem of providing a multi-phase brushless DC motor and a drive method therefor which avoid the conventional star-type configuration for the coil windings and drive all the windings with a more perfect sine voltage and current, thereby improving considerably the performance of the brushless DC motor.

Technical Solution

The present invention solves the first technical problem mentioned above by constructing a multi-phase brushless DC motor comprising a motor body and a driving module thereof, the drive module comprising a plurality of phase coil windings, wherein the driving module further comprises:

a controller, having a plurality of output terminals; wherein the output terminals are arranged to control respective control legs of each of a plurality of H-bridge unipolar inverters which is electrically connected to a respective phase of the multi-phase for the motor, with an output signal of the controller being pulse width-modulated sine waves, and the pulse width-modulated sine waves being adapted to drive respective ones of the plurality of H-bridge unipolar inverters; wherein the pulse width-modulated sine waves are of identical frequency and amplitude;

wherein each of the H-bridge unipolar inverters further comprises two output ends adapted to electrically connect with two ends of a respective one of the plurality of phase coil windings; and wherein each respective one of the plurality of phase coil windings is an independent one to another; with the pulse width-modulated sine waves corresponding to every two adjacent phase coil windings having a non-zero phase difference, and phase differences of the plurality of phase coil windings are identical.

According to the multi-phase brushless DC motor provided by the present invention, the phase is also called an included angle, and the phase difference is also called included angle difference.

According to the multi-phase brushless DC motor provided by the present invention, the plurality of phase coil windings comprise two phase coil windings, three phase coil windings, or phase coil windings in a number being a multiple of two or three.

According to the multi-phase brushless DC motor provided by the present invention, the controller is a Field-Programmable Gate Array (FPGA) or other electronic element with a Programmable Gate Array. The pulse width-modulated sine waves are provided by a Coordinate Rotation Digital Computer (CORDIC) algorithm and a multiplier.

According to the multi-phase brushless DC motor provided by the present invention, the controller is an analog or digital circuit unit. The pulse width-modulated sine waves are provided by a hardware circuit.

The present invention solves a further technical problem mentioned above by constructing a drive method for a multi-phase brushless DC motor, wherein a controller and a plurality of H-bridge unipolar inverters each of which representing each phase of the multi-phase for the motor and having output ends adapted to electrically connect with two ends of a respective one of a plurality of phase coil windings are used, the drive method comprising the steps of:

501) outputting pulse width-modulated sine waves with identical frequency and amplitude from the controller thereby driving respective ones of the plurality of H-bridge unipolar inverters for each phase; wherein the pulse width-modulated sine waves correspond to every two adjacent phase coil windings having a non-zero phase difference, and phase differences of the plurality of phase coil windings are identical; and

502) outputting sine wave driving voltages or sine wave driving currents in their corresponding phases from the respective ones of the plurality of H-bridge unipolar inverters to the corresponding, electrically connected phase coil windings.

According to the drive method for a multi-phase brushless DC motor provided by the present invention, each of the plurality of H-bridge unipolar inverters is preferably adapted to operate in a unipolar mode.

According to the drive method for a multi-phase brushless DC motor provided by the present invention, the plurality of phase coil windings comprise two phase coil windings, three phase coil windings, or phase coil windings in a number being a multiple of two or three.

Beneficial Effects of the Invention

The multi-phase brushless DC motor and drive method therefor provided by the present invention avoid the conventional star-type configuration for the coil windings and have the following advantages over existing solutions.

1. An H-bridge unipolar inverter is used for each winding;
2. A plurality of phase coil windings are each independent from one to another without a common connection point and consequently cause no influence to one another; and 3. The algorithm is simple and enables all the windings to be driven by smooth pure sine waves.

BRIEF DESCRIPTION OF THE DRAWINGS

FIG. 4 is a schematic timing view of pulse width-modulated sine waves output from the H-bridge unipolar inverters in FIG. 3;

FIG. 5 is a schematic view of a truth table for control signals in relation to output voltages of the H-bridge unipolar inverters in FIG. 3; and FIG. 6 is a schematic view of a circuit structure of a two-phase brushless DC motor according to a preferred embodiment of the present invention.

REFERENCE NUMBER 1-phase coil winding.

DESCRIPTION OF THE EMBODIMENTS

Preferred Embodiment of the Invention

Figure 1:
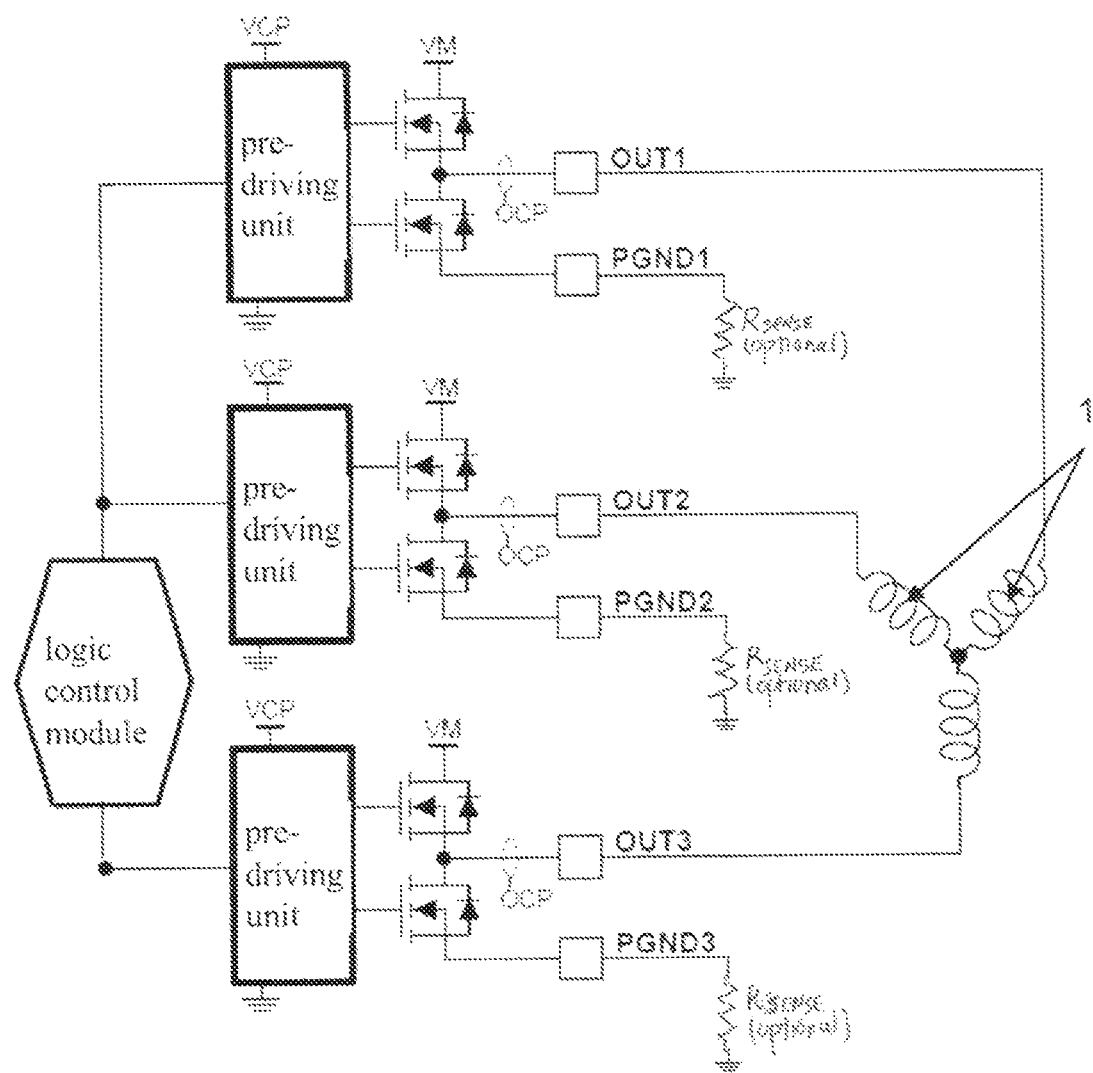
FIG. 1 is a schematic view of a circuit structure of a conventional three-phase brushless DC motor.
Figure 2:
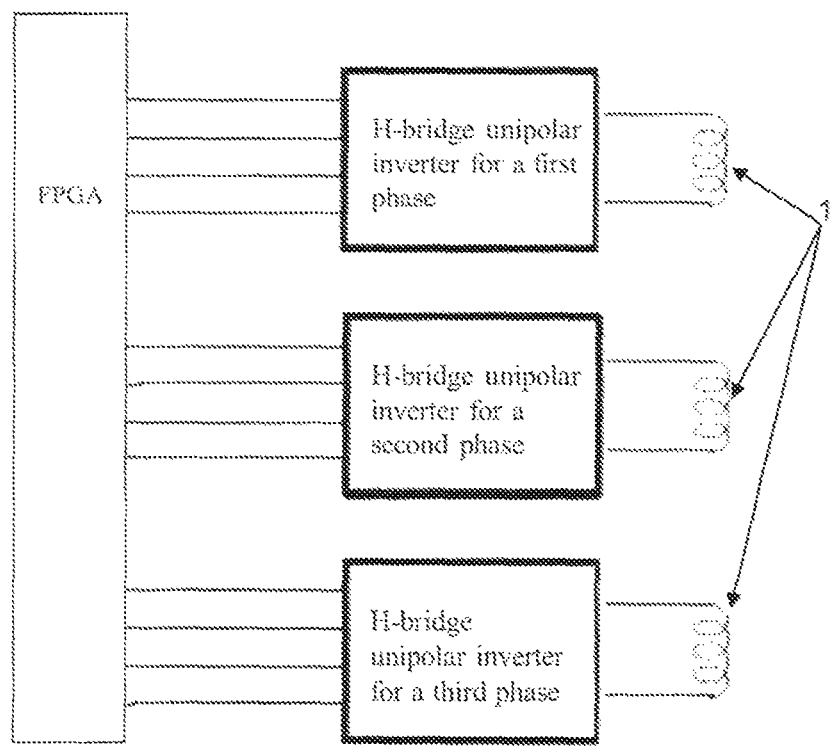
FIG. 2 is a schematic view of a circuit structure of a three-phase brushless DC motor according to a preferred embodiment of the present invention.

A three-phase brushless DC motor according to a preferred embodiment of the present invention is provided with a structure shown in FIG. 2, in which a three-phase brushless DC motor is driven by three H-bridge unipolar inverters and is provided with three independent phase coil windings 1 without a common connection point. In this way, all the windings can be driven by smooth pure sine waves, so that the phase coil windings 1 of the motor have a minimum power harmonic, thereby achieving a maximum driving efficiency. In addition, in this motor, a powerful high-speed FPGA is used to drive all the three H-bridge unipolar inverters simultaneously.

Figure 3:
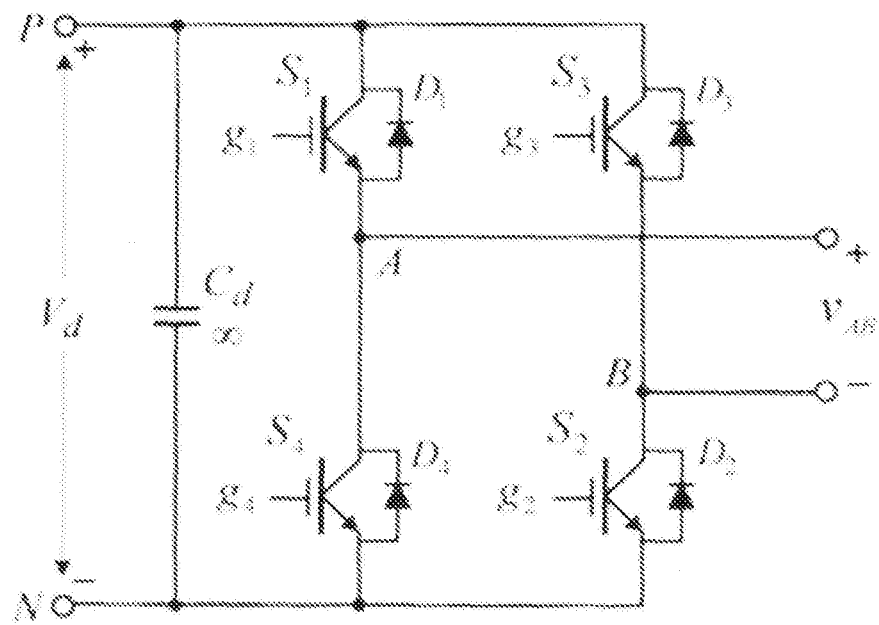
FIG. 3 is a schematic view of a circuit structure of each of the H-bridge unipolar inverters in FIG. 1.

The H-bridge unipolar inverters according to the preferred embodiment of the present invention each has a structure shown in FIG. 3, and is driven via four gates g1, g2, g3, and g4 and output a motor driving signal $V_{AB}$. In order to achieve an optimum switching efficiency, all the inverters are driven by a gate signal and operate in a unipolar mode, as shown in FIG. 4, in which $V_{AN}$ is a voltage of A with respect to a hypothetical functional earth N and $V_{BN}$ is a voltage of B with respect to the hypothetical functional earth N.

The three-phase brushless DC motor according to the preferred embodiment of the present invention is operated as follows.

The inverters driven via the gates are each driven by a group of four digital pins corresponding to the FPGA. In order to provide entirely smooth pure sine waves as signals for driving the windings, a sine pulse width modulation method is employed in such a manner that a PWM signal of a constant amplitude and a varying duty ratio of pulse width is transferred to each group of the H-bridge inverters in each period. The sine wave PWM signal of a varying duty ratio flows through each of the windings, so that the voltage on the winding has a wave form similar to that of an AC signal. Also, to achieve an optimum switching efficiency, all the inverters are driven by a gate signal and operate in a unipolar mode. The powerful high-speed FPGA in the three-phase brushless DC motor has an embedded CORDIC sine algorithm which uses 32 data bits to define an angle within a range of 0 to 360 degrees. The sine value of the angle (from +1.0 to −1.0) is represented by 24-bit data and is accurate to 2 seconds. The symbol of the data defines a direction of the current flowing through the windings. A 24×24 bit multiplier is used to multiply the 24-bit data of the sine value of the angle with the switching frequency to yield the duty ratio of the PWM signal. A constant value and an accumulated angle value are added at a fixed time interval, such that a constant unipolar modulated sine wave is generated. Changes to this constant value or time interval will lead to change in the frequency of the sine wave.

In this embodiment, to drive the three-phase DC motor, ⅓ of a 32-bit full-scale value and an angle value are added to yield sine wave data for a phase current of a second phase winding that is 120 degrees behind a first phase winding. Likewise, ⅔ of a 32-bit full-scale value and an angle value are added to yield sine wave data for a phase current of a third phase winding that is 240 degrees behind the first phase winding. In this order, the current flows into each of the phase windings sequentially so as to drive the motor to rotate, thereby achieving perfect synchronization.

FIG. 5 shows the truth relationship between the control signals output to the H-bridge inverters from the FPGA and the phase voltages output to the motor from the inverter bridges.

For any type of multi-phase motor, it can be driven by using the same method, as long as the angles between its phases are identical. For example, it may be a two-phase brushless DC motor with a phase angle of 90 degrees that has a circuit structure shown in FIG. 6. The FPGA control algorithm for a two-phase DC motor is similar to that of a three-phase DC motor, and the truth relationship between the control signals output to the H-bridge inverters from the FPGA and the phase voltages output to the motor from the inverter bridges in a two-phase DC motor is the same as that of a three-phase DC motor, and therefore the description thereof will not be made again.

Industrial Applicability

Described above are only preferred embodiments of the present invention, and any equivalent changes and modification made within the scope of the claims of the present invention shall be covered by the scope of the claims of the present invention.

What is claimed is:

1. A multi-phase brushless direct current motor, comprising a motor body, a driving module and a digital controller;
   said driving module comprising a plurality of phase coil windings each of which has two ends;
   the driving module further comprising a plurality of H-bridge unipolar inverters, each of which represents each phase of the multi-phase for the motor;
   said digital controller including a plurality of output terminals;
   wherein each of the H-bridge unipolar inverters further comprises two output ends adapted to electrically connect with said two ends of a respective one of the plurality of phase coil windings, such that the plurality of phase coil windings are arranged to operate independently without a common connection point;
   wherein one or more of the output terminals of the controller are arranged to electrically connect with respective control legs of each of the plurality of H-bridge unipolar inverters, with an output signal of the controller being pulse width-modulated sine waves, and said pulse width-modulated sine waves being adapted to drive respective ones of the plurality of H-bridge unipolar inverters;

wherein the pulse width-modulated sine waves are of identical frequency and amplitude;

wherein each respective one of said plurality of phase coil windings is independent one to another; with the pulse width-modulated sine waves corresponding to every two adjacent phase coil windings having a non-zero phase difference, and phase differences of the plurality of phase coil windings are identical.

2. The multi-phase brushless direct current motor according to claim 1, wherein said plurality of phase coil windings comprise at least one of: two phase coil windings, three phase coil windings, and phase coil windings in a number being a multiple of two or three.

3. The multi-phase brushless direct current motor according to claim 1, wherein the digital controller is a field-programmable gate array controller.

4. The multi-phase brushless direct current motor according to claim 3, wherein the field-programmable gate array controller comprises at least one of an analog and a digital circuit.

5. The multi-phase brushless direct current motor according to claim 1, wherein the plurality of phase coil windings are arranged in parallel without a common connection point.

6. A driving method for a multi-phase brushless direct current motor, the multiphase brushless direct current motor comprising a driving module comprising a plurality of phase coil windings each of which has two ends, the driving module further comprising a plurality of H-bridge unipolar inverters, each of which represents each phase of the multiphase for the motor, wherein each of the H-bridge unipolar inverters further comprises two output ends adapted to electrically connect with said two ends of a respective one of the plurality of phase coil windings, such that the plurality of phase coil windings are arranged to operate independently without a common connection point; the method comprising step of:

outputting pulse width-modulated signals with identical frequency and amplitude from a controller to thereby drive respective ones of the plurality of H-bridge unipolar inverters for each phase;

wherein the driving method further comprises the steps of:

outputting pulse width-modulated sine waves with identical frequency and amplitude from the controller to thereby drive respective ones of the plurality of H-bridge unipolar inverters for each phase; wherein the pulse width-modulated sine waves correspond to every two adjacent phase coil windings having a non-zero phase difference, and phase differences of the plurality of phase coil windings are identical; and outputting sine wave driving voltages or sine wave driving currents in their corresponding phases from the respective ones of the plurality of H-bridge unipolar inverters to the corresponding, electrically connected phase coil windings.

7. The driving method for a multi-phase brushless direct current motor according to claim 6, wherein each of the plurality of H-bridge unipolar inverters for each respective phase is adapted to operate in a unipolar mode.

8. The driving method for a multi-phase brushless direct current motor according to claim 6, wherein said plurality of phase coil windings comprise at least one of: two phase coil windings, three phase coil windings, and phase coil windings in a number being a multiple of two or three.

9. The driving method for a multi-phase brushless direct current motor according to claim 6, wherein the plurality of phase coil windings are arranged in parallel without a common connection point.

10. A three-phase brushless direct current motor, comprising:

a motor body, a driving module and a digital controller;

said driving module comprising three phase coil windings each of which has two ends;

the driving module further comprising three H-bridge unipolar inverters, each of which represents respective ones of the three phases of the three-phase motor;

said digital controller including six output terminals;

wherein each of the three H-bridge unipolar inverters further comprises two output ends adapted to electrically connect with said two ends of a respective one of the three phase coil windings, such that the three phase coil windings are arranged to operate independently without a common connection point;

wherein the output terminals of the controller are arranged to electrically connect with respective control legs of each of the three H-bridge unipolar inverters, with an output signal of the controller being pulse width-modulated sine waves, and said pulse width-modulated sine waves being adapted to drive respective ones of the three H-bridge unipolar inverters;

wherein the pulse width-modulated sine waves are of identical frequency and amplitude;

wherein each respective one of said three phase coil windings is independent one to another; with the pulse width-modulated sine waves corresponding to every two adjacent phase coil windings having a non-zero phase difference, and phase differences of the three phase coil windings being identical.

11. The three-phase brushless direct current motor according to claim 10, wherein the three phase coil windings are arranged in parallel without a common connection point.

* * * * *